(12) United States Patent
Rathod et al.

(10) Patent No.: US 11,524,733 B2
(45) Date of Patent: *Dec. 13, 2022

(54) TRACK ASSEMBLY BUSHING HAVING WHILE IRON MEMBER

(71) Applicant: Caterpillar Inc., Deerfield, IL (US)

(72) Inventors: Chandrasen R. Rathod, Peoria, IL (US); Roger L. Recker, Dunlap, IL (US); Robert J. Pickerill, Peoria, IL (US); Susan M. Graham, Morton, IL (US); Scott Keele, Germantown Hills, IL (US); Thomas J. Yaniak, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 519 days.

This patent is subject to a terminal disclaimer.

(21) Appl. No.: 16/534,866

(22) Filed: Aug. 7, 2019

(65) Prior Publication Data

US 2021/0039728 A1    Feb. 11, 2021

(51) Int. Cl.
  *B62D 55/15*  (2006.01)
  *B62D 55/12*  (2006.01)
  *B62D 55/21*  (2006.01)

(52) U.S. Cl.
  CPC .............. *B62D 55/15* (2013.01); *B62D 55/12* (2013.01); *B62D 55/21* (2013.01)

(58) Field of Classification Search
  CPC ........ B62D 55/15; B62D 55/12; B62D 55/21; B62D 55/32; Y10T 16/05; Y10T 29/49668; F16C 17/02; F16C 17/022; F16C 33/06; F16C 2350/26
  See application file for complete search history.

(56) References Cited

U.S. PATENT DOCUMENTS

| | | | |
|---|---|---|---|
| 2,784,285 A * | 3/1957 | Brauer | B23K 3/087 219/615 |
| 3,319,037 A | 5/1967 | Stein et al. | |
| 3,353,005 A | 11/1967 | Sisson et al. | |
| 3,514,128 A | 5/1970 | Hack et al. | |
| 3,684,585 A * | 8/1972 | Stroup | C23C 16/32 428/472.1 |
| 4,042,282 A * | 8/1977 | Haslett | B60S 1/68 305/194 |

(Continued)

FOREIGN PATENT DOCUMENTS

| | | |
|---|---|---|
| EP | 2766908 B1 | 4/2018 |
| JP | S59114169 | 7/1984 |
| WO | 2019109138 | 6/2019 |

OTHER PUBLICATIONS

Laird, George, et al. "Chapter 1: Introduction to AR Cast Irons." Abrasion-resistant cast iron handbook. American Foundry Society, Des Plaines, III, 2015 (digital edition).

(Continued)

*Primary Examiner* — Kip T Kotter
*Assistant Examiner* — Emily G. Castonguay
(74) *Attorney, Agent, or Firm* — Bookoff McAndrews PLLC

(57) ABSTRACT

A bushing for a track assembly, according to one or more embodiments, includes: a tubular bushing substrate having a longitudinal length and an outer surface; and at least one white iron member fixed to the outer surface of the tubular bushing substrate.

20 Claims, 6 Drawing Sheets

(56) References Cited

U.S. PATENT DOCUMENTS

| | | | | |
|---|---|---|---|---|
| 4,129,045 | A | * | 12/1978 | Kishitani ............. B62D 55/205 |
| | | | | 305/204 |
| 6,414,258 | B1 | * | 7/2002 | Amano ................. B23K 9/046 |
| | | | | 219/76.14 |
| 6,948,784 | B2 | | 9/2005 | Wodrick et al. |
| 8,905,493 | B2 | | 12/2014 | Liu et al. |
| 9,981,352 | B2 | | 5/2018 | Bargiacchi et al. |
| 10,040,495 | B2 | | 8/2018 | Marchione et al. |
| 2006/0017323 | A1 | * | 1/2006 | Wodrich ................ B62D 55/14 |
| | | | | 305/202 |
| 2007/0154738 | A1 | * | 7/2007 | Ganguly ................. C23C 30/00 |
| | | | | 427/446 |
| 2016/0009324 | A1 | * | 1/2016 | Lamela ................. B62D 55/21 |
| | | | | 305/194 |
| 2017/0216949 | A1 | * | 8/2017 | Oh ........................... B23K 9/04 |
| 2021/0284259 | A1 | * | 9/2021 | Weaver ................. B62D 55/32 |

OTHER PUBLICATIONS

"White Cast Iron." ScienceDirect, https://www.sciencedirect.com/topics/engineering/white-cast-iron (Retrieved Aug. 7, 2019).

\* cited by examiner

TRACK ASSEMBLY BUSHING HAVING WHILE IRON MEMBER

TECHNICAL FIELD

The present disclosure relates generally to a bushing, and more particularly, to bushings for a track assembly of a machine.

BACKGROUND

Track type machines typically utilize track chains on each side of the machine that engage the ground surface during propulsion of the machine. A plurality of individual links are pivotably coupled via bushing and pin arrangements to form the track chain. A sprocket, driven by an engine of the machine, engages the bushings and translates the chain about one or more idlers. As the chain translates, the connected links engage a ground surface under the machine, for example, via coupled track shoes, and propel the machine on the surface. Track chains can be a straight link chains with alternating inner and outer links, or can be offset link chains where all the links are alike. In both types of track chains, the elements wear over time, particularly the bushings that are continuously engaging with the sprocket in order to propel the machine. Hardening elements of the track chain may increase the durability and wear-resistance of the track chain element, but may also increase the brittleness or otherwise negatively affect the properties of the track chain element. As such, wear-resistance and strength, along with costs of production and maintenance, are often important considerations in the manufacture and assembly of the track chain.

An exemplary track chain is disclosed in U.S. Pat. No. 6,948,784 ("the '784 patent") to Wodrick et al. The '784 patent discloses a track pin bushing for an endless traction chain. The track pin bushing in the '784 patent may have a metallurgically bonded wear-resistant coating. While the bushings of the '784 patent may be suitable for some applications, they may not be suitable for other applications.

The bushings of the present disclosure may solve one or more of the problems set forth above and/or other problems in the art. The scope of the current disclosure, however, is defined by the attached claims, and not by the ability to solve any specific problem.

SUMMARY

In one aspect, a bushing for a track assembly may include: a tubular bushing substrate having a longitudinal length and an outer surface; and at least one white iron member fixed to the outer surface of the tubular bushing substrate.

In another aspect, a method for producing a bushing for a track assembly may include fixing at least one white iron member to an outer surface of a tubular bushing substrate.

In another aspect, a track assembly may include a bushing and a pin. The bushing may include: a tubular bushing substrate having a longitudinal length, an axial bore, and a circumferential recess formed in an outer surface of a central portion of the tubular bushing; and a white iron sleeve received in the circumferential recess and wrapping at least partially around the central portion of tubular bushing, the white iron sleeve including at least one white iron arc segment brazed to the tubular bushing substrate. The pin may be received in the axial bore of the tubular bushing substrate.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," substantially," and "approximately" are used to indicate a possible variation of ±10% in the stated value.

Figure 1:
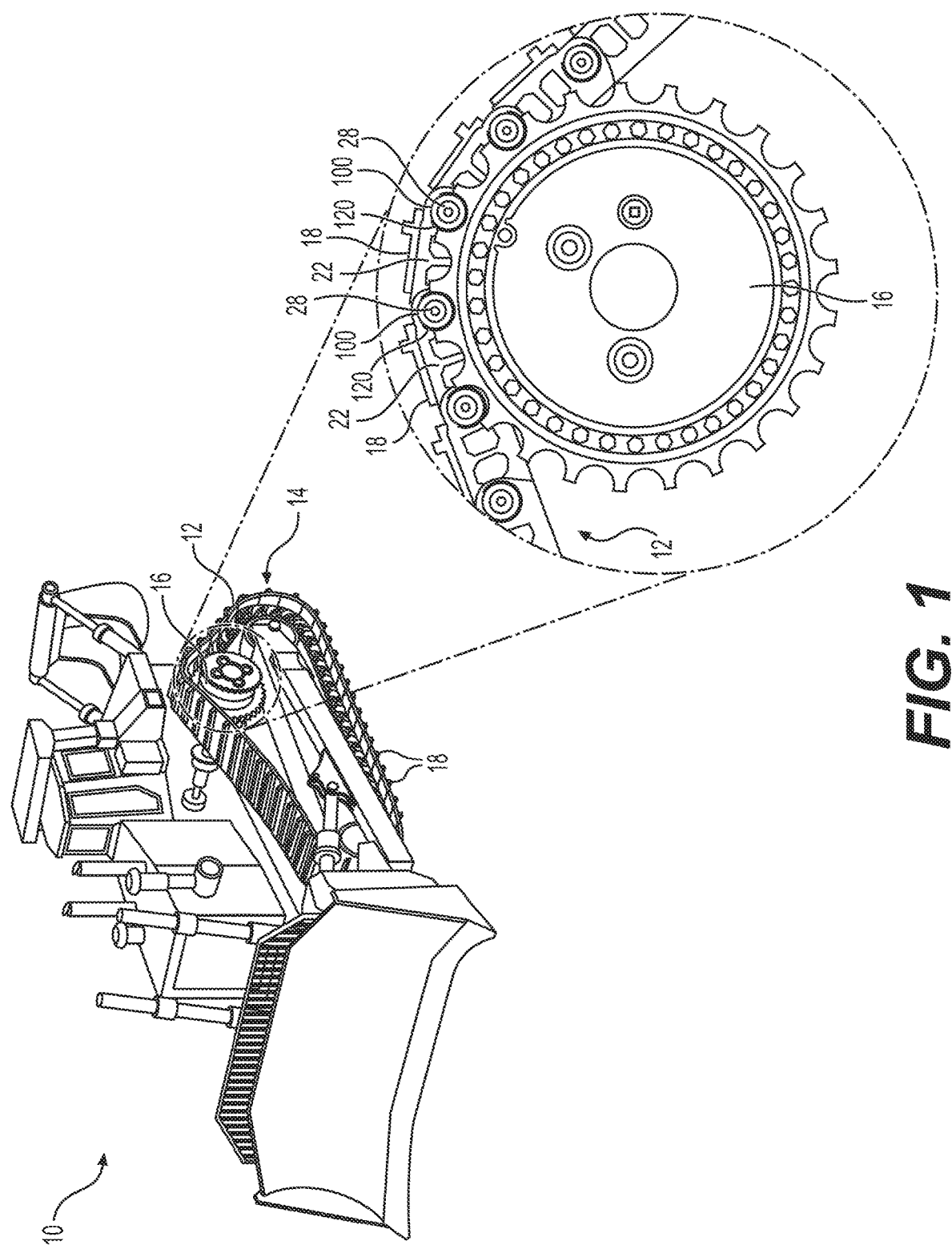
FIG. 1 is a perspective view of an exemplary machine, with an enlarged section of the exemplary machine showing the engagement of a sprocket and bushings of a track assembly.

FIG. 1 illustrates a machine 10 with a track assembly 12 according to the present disclosure. Machine 10 may be any mobile machine that performs some type of operation with an industry such as mining, construction, farming, transportation, or any other industry known in the art, for example, a dozer, an excavator, a loader, a backhoe, a motor grader, or any other earth moving machine. Track assembly 12, which may also be referred to as a track link assembly, may be coupled to an undercarriage assembly 14 of machine 10 and driven by a machine engine or other power source (not shown) via at least one drive gear or sprocket 16. A separate track assembly 12 may be coupled to each side of machine 10 and form separate endless loops. A plurality of track shoes 18 may be coupled to an outer surface of track assembly 12 in order to aid in the engagement of the ground surface.

Track assembly 12 may be a chain that includes multiple structurally similar link subassemblies, each of which may include a pair of links. A pair of links may include a link 22 and a respectively paired link (not shown in the enlarged section of FIG. 1, which is a side view) that is parallel and spaced opposite from link 22. Links 22 and their respectively paired links may be straight or offset links, and each include apertures at respective opposite ends (e.g., a first-end aperture and a second-end aperture).

Successive link subassemblies may be coupled by a pin 28 and a bushing 100. For example, to couple a first link subassembly with a successive second link subassembly, the pin 28 may be fixedly received in the first-end apertures of the links of the first link subassembly, and the bushing 100 may be fixedly received in the second-end apertures of the links of the second link assembly. As such, pin 28 and bushing 100 couple two link subassemblies together to form a portion of track assembly 12.

Each pin 28 may be a substantially cylindrical rod, and may be sized to be slip fit through bushing 100. Each bushing 100 may be generally cylindrical, with a cylindrical channel extending longitudinally through the bushing 100 as a bore. The bore may have a constant diameter to rotatably receive pin 28.

Each bushing 100 may have a sleeve 120 wrapping at least partially around a central portion of bushing 100. Sleeve 120 may serve as a contact surface that engages sprocket 16 when the track assembly 12 is driven by sprocket 16. Additional aspects of bushing 100 and sleeve 120 are described below in connection with FIGS. 2A, 2B, and other figures.

Figure 2A:
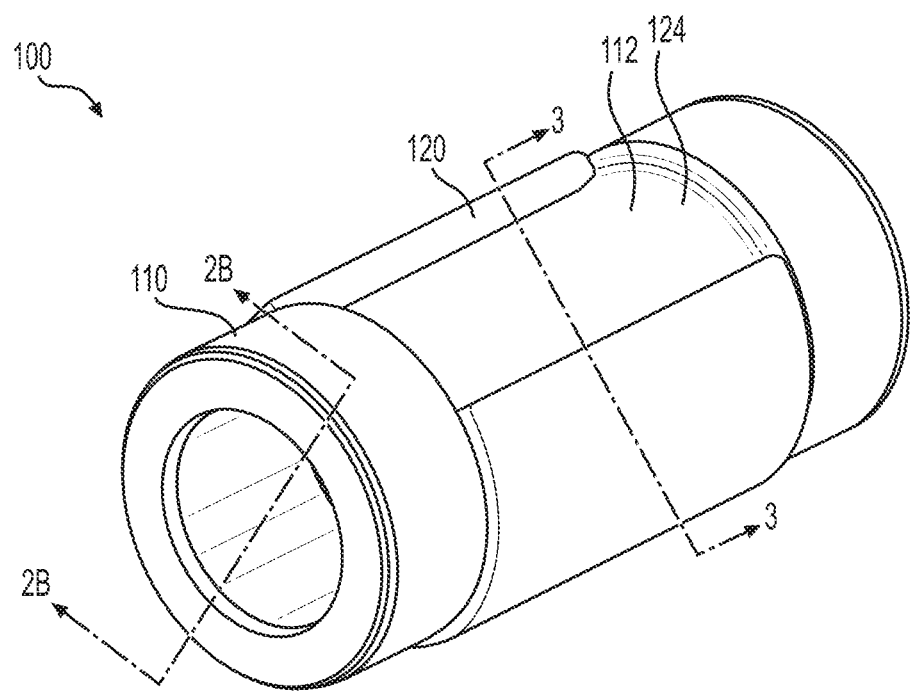
FIG. 2A is a perspective view of an exemplary bushing for a track assembly.
Figure 2B:
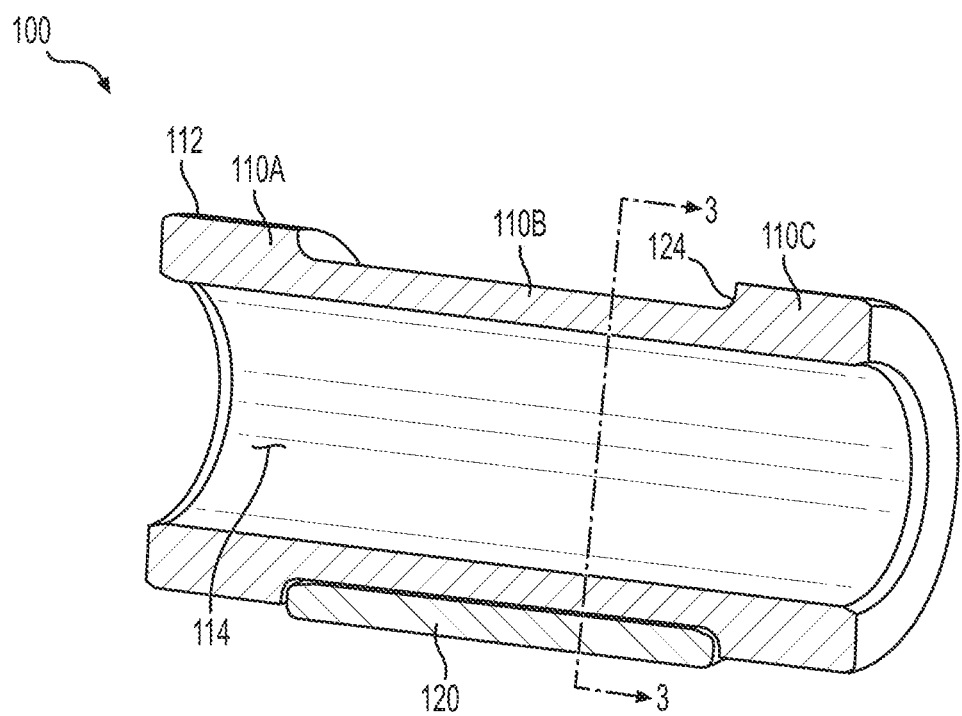
FIG. 2B is a longitudinal cross-sectional view of the bushing of FIG. 2A.

FIG. 2A is a perspective view of an exemplary bushing 100 according to the present disclosure. FIG. 2B is a longitudinal cross-sectional view of bushing 100, corresponding to the cross-section 2B-2B marked in FIG. 2A. As shown in these figures, bushing 100 may include a tubular bushing substrate 110 having a longitudinal length and an outer surface 112. Bushing 100 may further include a sleeve 120 fixed to the outer surface 112 of the tubular bushing substrate 110.

Sleeve 120 may be wear-resistant. When bushing 100 is used in track assembly 12, sleeve 120 may serve as a wear-resistant layer providing bushing 100 with enhanced wear resistance when bushing 100 engages sprocket 16. In general, sleeve 120 may be or include at least one member, wherein such a member may be a tubular member (e.g., tube) or an arc segment. In some embodiments, sleeve 120 may include at least one arc segment (e.g., a single arc segment or a plurality of arc segments) fixed to the outer surface 112. In some embodiments, sleeve 120 may be a single tubular member, such as a tube that wraps around the tubular bushing substrate 110.

Tubular bushing substrate 110 may have a first end portion 110A, a central portion 110B, and a second end portion 110C. Additionally, tubular bushing substrate 110 may have a bore 114 to receive a track pin, such as pin 28 discussed above in connection with FIG. 1. Bore 114 may have a constant diameter.

A recess 124 may be formed in the outer surface 112 of tubular bushing substrate 110. For example, as shown in FIGS. 2A and 2B, recess 124 may be formed in the portion of outer surface 112 corresponding to the central portion 110B of the tubular bushing substrate 110. Recess 124 may be a circumferential recess traversing the entire circumference of the central portion 110B. Sleeve 120 may be at least partially disposed in recess 124.

While a recess 124 is shown in FIGS. 2A and 2B, the present disclosure is not so limited. In other examples, the portion of the tubular bushing substrate 110 on which sleeve 120 is disposed (e.g., central portion 110B) may be flush with other portions of the tubular bushing substrate (e.g., end portions 110A and 110C), or be stepped-up (e.g., radially protruded) relative to those other portions, instead of being recessed as shown in FIGS. 2A and 2B.

Sleeve 120 may have a substantially constant thickness, as shown in FIGS. 2A and 2B. However, it is also possible for sleeve 120 to have a non-uniform thickness. For example, in some embodiments, the thickness of sleeve 120 (or of an individual arc segment) may be variable (e.g., gradually increasing or decreasing) along a circumferential direction around the tubular bushing substrate 110, but constant along the longitudinal length of the tubular bushing substrate 110.

Sleeve 120 may have a thickness such that a portion of the sleeve 120 protrudes out of recess 124 in a radial direction. However, it is also possible for sleeve 120 to be flush with the outside of recess 124. The depth of recess 124 may depend on the thickness of sleeve 120, which in turn may depend on the material that forms sleeve 120. The overall outer diameter of bushing 100 (including sleeve 120) may depend on the application of the bushing 100.

As shown in FIG. 2A, sleeve 120 may extend over less than a full circumference of the tubular bushing substrate 110. For example, if bushing 100 is used in the track assembly 12, then sleeve 120 may cover the portion of the bushing 100 that engages sprocket 16. In such an arrangement, sleeve 120 does not necessarily need to cover the portions of bushing 100 that do not contact sprocket 16. For example, a portion of recess 124 that is exposed (not covered) by sleeve 120 may be facing away from sprocket 16 (when sprocket 16 is engaged) and facing toward the track shoe 18 attached to the link subassembly to which the tubular bushing 100 is fixed. In some embodiments, sleeve 120 may extend 270 degrees or less of the full circumference of the tubular bushing substrate 110, such that a 90 degree or more arc portion of the tubular bushing substrate 110 not covered by sleeve 120 faces the corresponding track shoe 18. In this context, the full circumference of the tubular bushing substrate 110 may be a circumference around any portion of the tubular bushing substrate 110 at which the sleeve 120 is disposed. When a recess 124 is provided in the tubular bushing substrate 110, this circumference may be the circumference along the bottom of recess 124.

Furthermore, sleeve 120 may extend less than an entirety of the longitudinal length of the tubular bushing substrate 110. For example, as shown in FIGS. 2A and 2B, sleeve 120 may cover a bottom of the recess 124 formed in the central portion 110B, and without covering the end portions 110A and 110B. However, it is also possible for sleeve 120 to extend over the entire longitudinal length of the tubular bushing substrate 110.

Figure 3:
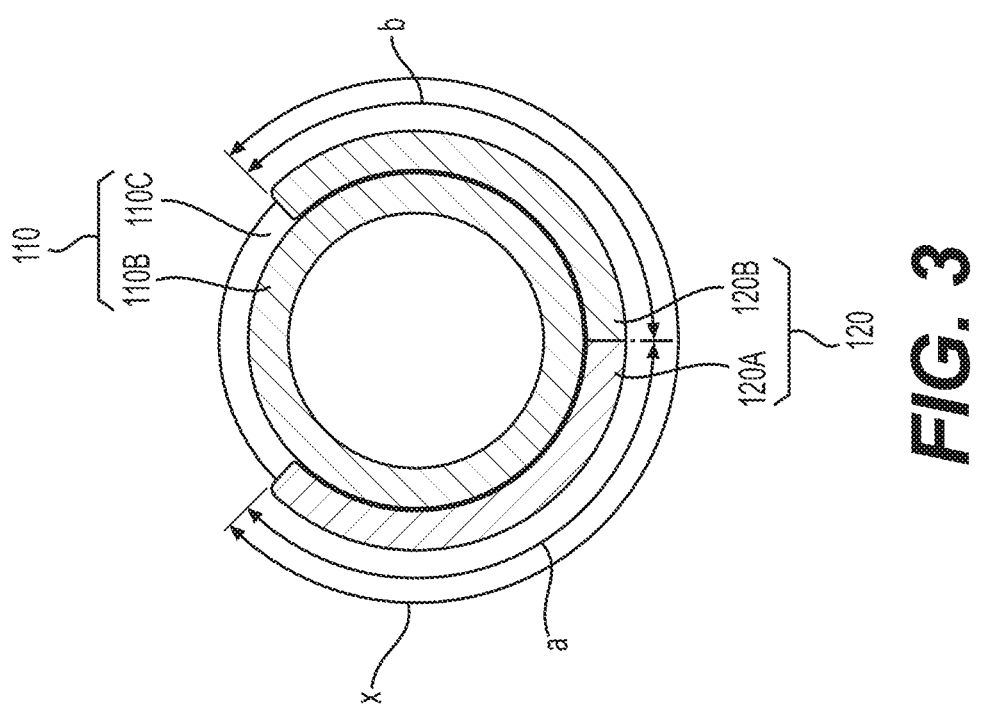
FIG. 3 is a transverse cross-sectional view of the bushing of FIG. 2A.

FIG. 3 is a transverse cross-sectional view of the bushing 100, showing the section corresponding to the cross-section 3-3 marked in FIG. 2B. As shown, sleeve 120 may include a plurality of arc segments 120A and 120B fixed to the outer surface 112 of the tubular bushing substrate 110. Arc segments 120A and 120B may be successively arrayed along a circumferential direction around the tubular bushing substrate 110, as shown in FIG. 3. However, it is also possible for arc segments 120A and 120B to be arrayed along the longitudinal length of the tubular bushing substrate 110.

The arc of the full circumference of the tubular bushing substrate 110 that is covered by sleeve 120 has an angle labeled in FIG. 3 as angle x, which is also the central angle of sleeve 120. Each arc segment 120A and 120B may be a curved segment traversing a portion of the arc covered by sleeve 120. In the aforementioned example in which angle x is 270 degrees, the central angle, a, of arc segment 120A and the central angle, b, of arc segment 120B may sum to 270 degrees (e.g., a and b each being 135 degrees). It is noted, however, that the present disclosure is not limited to any specific angle. In general, the sleeve 120 as a whole may have any suitable central angle. Angle x may be any angle that is greater than 0 degrees, and less than or equal to 360 degrees. If the sleeve 120 includes one or more arc segments, central angle of any one or more of such arc segments of sleeve 120 may be any angle that is greater than 0 degrees, and less than or equal to 360 degrees.

In some embodiments, angle x may be in a range of 180 degrees to 360 degrees, and individual arc segments may have a central angle in a range of from 45 degrees to 180 degrees.

In some embodiments, the sleeve 120 may cover the entirety of the full circumference of the tubular bushing substrate 110, in which case angle x would be 360 degrees. In such embodiments, sleeve 120 may be a tube. However, it is also possible for sleeve 120 to be a plurality of arc segments that collectively cover the entirety of the full circumference of the tubular bushing substrate 110. Additionally, it is also possible for an individual arc segment to have a central angle of 360 degrees, even if the sleeve 120 includes multiple arc segments. For example, a sleeve 120 may include multiple 360-degree arc segments arrayed along the longitudinal length of the tubular bushing substrate 110.

Figure 4:
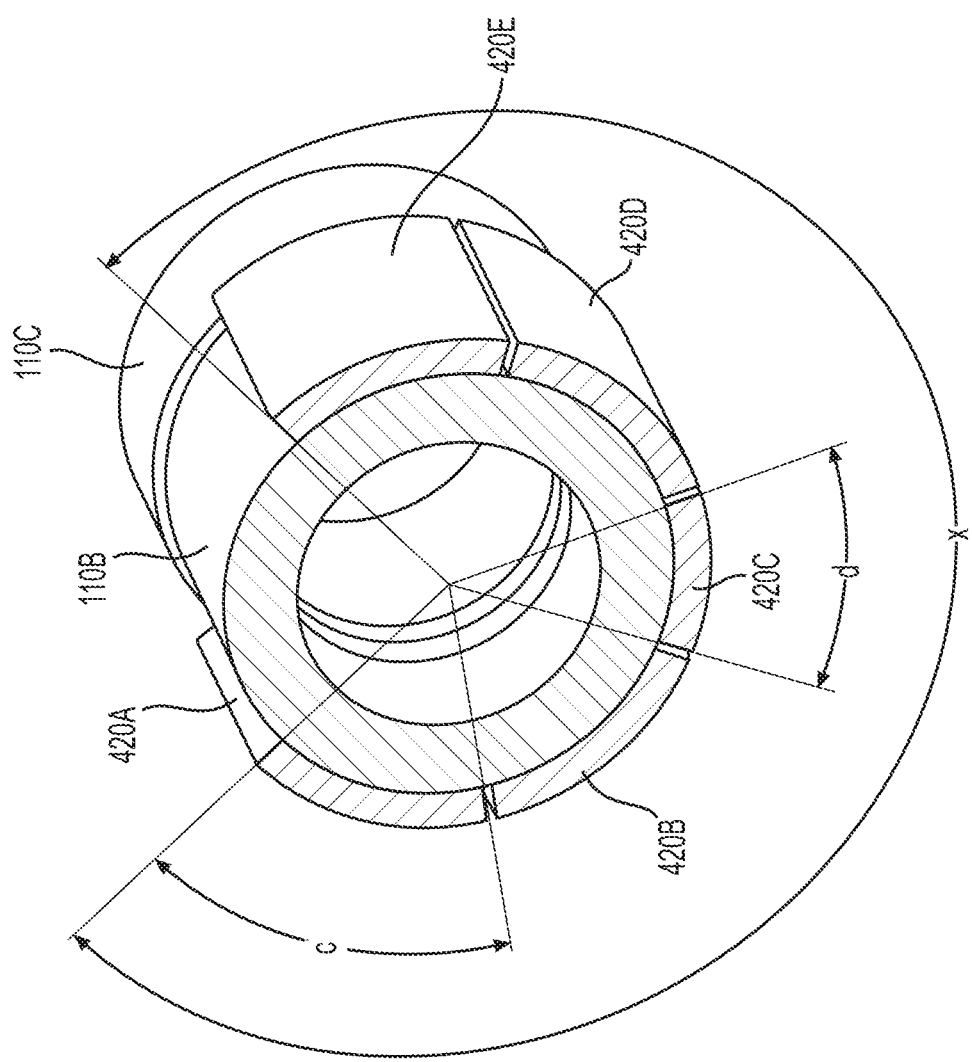
FIG. 4 illustrates another exemplary bushing for a track assembly.

Sleeve 120 may include more than two arc segments. For example, FIG. 4 shows an embodiment in which the sleeve 120 includes five arc segments 420A, 420B, 420C, 420D, and 402E. Furthermore, as illustrated in FIG. 4, different arc segments may have different central angles, and thus different sizes. For example, arc segments 420A and 420C have different respective central angles c and d. Furthermore, while embodiments in which sleeve 120 includes a plurality of arc segments have been described, it is also possible for the sleeve 120 to include only a single arc segment.

In general, arc segments may have any suitable shape, size, and/or surface texture. For example, an arc segment may be a small arc, a large arc, button-shaped, rounded, smooth or rough. The coverage area of an arc segment on the circumferential plane of the tubular bushing substrate 110 may be non-rectangular (e.g., may be round, diamond-shaped, etc.). Arc segments constituting the sleeve 120 may have any suitable combination of differing shapes, differing sizes, and/or surface textures, to form a patchwork on tubular bushing substrate 110.

Furthermore, as illustrated in FIG. 4, successive arc segments may be spaced apart from one another in a circumferential direction. Alternatively, successive arc segments may be in direct physical contact with one another, as illustrative in FIG. 3.

Constituent member(s) of sleeve 120, such as arc segments 120A, 120B, 420A, 420B, 420C, 420D, and 420E described above, or a tube as described above, may be formed of a wear-resistant material such as white iron. In this disclosure, the term "white iron" means cast iron in which all or substantially all carbon is present as carbide. When formed of white iron, member(s) of sleeve 120 may be referred to as white iron member(s). Examples of white iron include pearlitic (FeC) white irons, Ni-hard or Ni—Cr ($M_3C$) white irons, Ni-hard 4 ($M_7C_3$) white irons, and high-Cr ($M_7C_3$) white irons (also referred to as "high chrome white irons"). In some embodiments, sleeve 120 may include white iron member(s) formed of a high chrome white iron having a chromium content of 12 wt. % or higher (e.g., a chromium content of 12 wt. %, 15 wt. %, 20 wt. % or 25 wt. %) and suitable contents of other elements (e.g., a carbon content in a range of 2 to 3 wt. %, a molybdenum content of 0.5% to 3.5 wt. %, a manganese content of 0.5 to 1.5 wt. %, a silicon content of up to 1.0 wt. %, and a nickel content of up to 0.5 wt. %), with a balance being iron. Examples of white irons include white irons specified by ASTM A532 (e.g., ASTM A532 II-A, II-B, II-C, II-D, II-E, and III-A high chrome cast irons, and ASTM A532 Ni-hard cast irons). White irons may also be referred to as abrasion-resistant cast irons. While examples of white irons have been given, the present disclosure is not so limited, and it is understood that a white iron member may be formed of any suitable hard wear facing white iron.

Tubular bushing substrate 110 may be formed of steel of any suitable type. In some embodiments, tubular bushing substrate 110 may be formed of high-carbon chromium steel. High-carbon chromium steel encompasses chromium-containing steel having a carbon content of 0.55 wt. % or higher, such as 52100 alloy steel. The steel forming tubular bushing substrate 110 may be heat-treated (e.g., using induction or furnace heating) or non-heat-treated steel. Example of heat treatment processes include carburization and case hardening. In some embodiments, in addition to or as an alternative to using high-carbon chromium steel for tubular bushing substrate 110, the outer surface 112 of the tubular bushing substrate 110 may be carburized at locations where the sleeve 120 is disposed. For example, the part of the outer surface 112 within recess 124 may be carburized. In general, sleeve 120 and tubular bushing substrate 110 may be formed of different respective materials.

Arc segments of sleeve 120 may be fixed to the outer surface of the tubular bushing substrate 110 by any suitable fixation method. In some embodiments, the arc segments of sleeve 120 are brazed to the outer surface of tubular bushing substrate 110, such that the arc segments are fixed to the tubular bushing substrate 110 via a solidified brazing filler. The solidified brazing filler may be referred to as a brazed joint.

Figure 5:
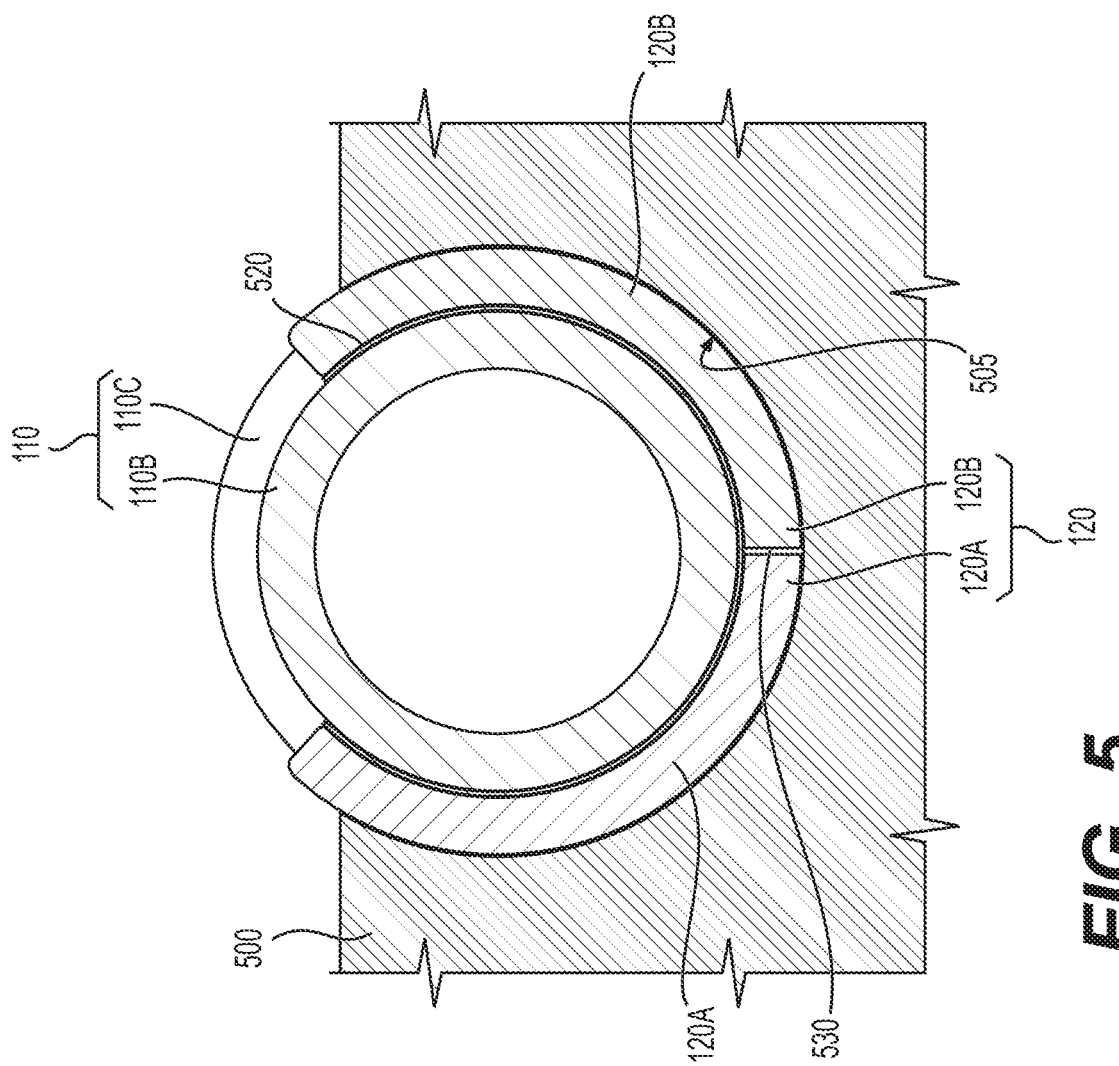
FIG. 5 illustrates the use of a holding fixture to produce the bushing of FIG. 2A using a brazing method.

FIG. 5 illustrates a method of producing bushing 100 by brazing a plurality of arc segments (e.g., segments 120A and 120B) to the central portion 110B of the tubular bushing substrate 110. As shown, the brazing may be performed using a holding fixture 500. Holding fixture 500 may have a holding surface 505 designed to hold arc segments 120A and 120B in place while they are being brazed to the tubular.

Figure 6:
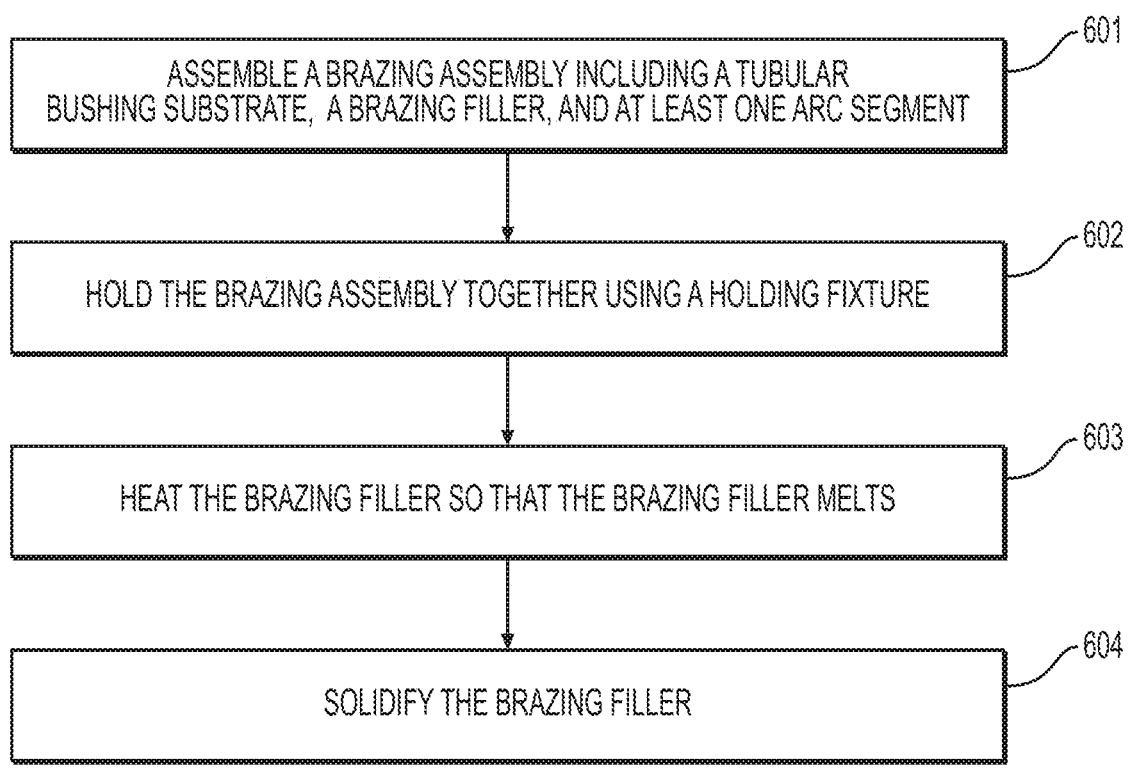
FIG. 6 is a flowchart illustrating a method of brazing an arc segment to a tubular bushing substrate using the holding fixture illustrated in FIG. 5.

FIG. 6 is a flowchart illustrating a method of brazing an arc segment to a tubular bushing substrate using the holding fixture illustrated in FIG. 5. Step 601 may include assembling a brazing assembly including a tubular substrate (e.g., tubular bushing substrate 110), a brazing filler (e.g., brazing filler 520), and at least one arc segment (e.g., arc segments 120A and 120B). In the brazing assembly, arc segments 120A and 120B may be mated to tubular bushing substrate 110, with brazing filler 520 interposed between the tubular bushing substrate 110 and the arc segments 120A and 120B. The brazing filler 520 may initially be in the form of a sheet that is wrapped around at least the portion of the outer surface 112 of the tubular bushing substrate 110 that is to be covered by the arc segments 120A and 120B.

Step 602 may include holding the brazing assembly together using holding fixture 500. In step 602, the holding surface 505 of the holding fixture 500 may be placed on arc segments 120A and 120B, as shown in FIG. 5, so that the arc segments 120A and 120B are held in place.

Step 603 may include heating the brazing filler 520 so that the brazing filler 520 melts. The heating may be performed while holding the brazing assembly together using the holding fixture 500. Afterwards, step 604 may include solidifying the brazing filler 520. In step 604, the brazing filler may be cooled and solidified so that arc segments 120A and 120B are joined to the tubular bushing substrate 110 via the solidified brazing filler 520. The entire brazing assembly may be heated in step 603 and cooled in step 604. The solidified brazing filler 520 may also join the arc segments 120A and 120B to one another.

In step 603, the heating may cause brazing filler 520 to flow. Thus, if the arc segments 120A and 120B are spaced apart from one another in the circumferential direction so as to have a gap 530 between the segments, the brazing filler 520 may partially or fully flow into the gap 530. The brazing may be performed in a vacuum oven, for example.

As shown in FIG. 5, holding surface 505 of the holding fixture 500 may have a concave contour that substantially matches the outer contour of the arc segments 120A and 120B when the arc segments 120A and 120B are mated to the tubular bushing substrate 110. In some embodiments, the holding fixture 500 may be a cradle or a tube, and the holding surface 505 may be a concave surface of the cradle, or the inner surface of the tube. It is noted, however, that the present disclosure is not so limited, and that holding fixture 500 may, in general, be any apparatus suitable for holding the aforementioned components in place during brazing. For example, holding fixture 500 may be a wire or plurality of wires. Additionally, holding fixture 500 may a plurality of pieces that collectively provide holding surface 505.

Furthermore, while embodiments using brazing have been described, it is also possible to attach sleeve 120 (and any of its constituent members, such as arc segments 120A and 120B) to tubular bushing substrate 110 using other suitable forms of attachments. For example, other forms of attachments may include soldering (e.g., high strength soldering), mechanical press fitting, welding (e.g., plasma-transferred arc (PTA) welding), and attachment via epoxy and/or other adhesives. That is, the plurality of arc segments constituting sleeve 120 may be soldered, mechanically press fitted, welded, or adhered to the tubular bushing substrate. In some examples, sleeve 120 is a tube fixed to tubular bushing substrate 110 by mechanical press fitting. It is noted that the various forms of attachments are not intended to be mutually exclusive, and may be used in combination with one another.

INDUSTRIAL APPLICABILITY

The disclosed aspects of track assembly 12 may be used in any machine that includes a tracked undercarriage that includes links coupled together to form one or more tracks. Track assembly 12 described herein may provide greater wear-resistance, a longer work duration, an increased performance, a reduced risk of deformation, and a lower likelihood of requiring maintenance or replacement.

The disclosed aspects of bushing 100, including sleeve 120, may provide wear-resistance for the portion of the bushing 100 that contacts sprocket 16, when bushing 100 is used in track assembly 12. Accordingly, track bushing wear life may be increased, leading to lower fleet undercarriage maintenance costs.

As described above, sleeve 120 may be made of white iron, which provides for wear resistance. The white iron material of sleeve 120 may be different from the material of the underlying tubular bushing substrate 110. Therefore, sleeve 120 may serve a specialized wear-resistant layer that confers wear resistance to the bushing 100 while avoiding potential expenses of having the entire bushing be constructed of the same wear-resistant material. The tubular bushing substrate 110 may additionally have wear-resistant properties, such as a high-carbon chromium steel composition or a carburized layer as described above. Therefore, if the sleeve 120 becomes worn out, the bushing 100 may still have function with a degree of wear resistance.

As described above, sleeve 120 may be assembled from a plurality of smaller members, such as arc segments. Therefore, production of bushing 100 may be potentially facilitated in cases in which it is more cost effective to produce a plurality of white iron arc segments than a continuous, one-piece white iron sleeve. Furthermore, in certain embodiments, the arc segments constituting the sleeve 120 may cover less than the entire circumference of the tubular bushing substrate 110, thereby potentially permitting the cost of the sleeve 120 to be reduced as compared to a sleeve that covers the entire circumference.

As described above, sleeve 120 may be disposed in a recess 124 formed in the outer surface 112 of the tubular bushing substrate 110. The recess 124 may provide for design flexibility in regards to the overall outer diameter of the bushing 100 with the sleeve 120 included. For example, if the thickness of arc segments forming the sleeve 120 is constrained to a limited range of thicknesses, the overall outer diameter of bushing 100 may be still be set based on the depth of the recess 124.

As described above, a holding fixture 500 may be used to braze arc segments of the sleeve to the tubular bushing substrate 110. Accordingly, the holding fixture 500 may facilitate production of the bushing 100 having a multi-segment sleeve 120 fixed to a tubular bushing substrate 110.

It will be apparent to those skilled in the art that various modifications and variations can be made to the disclosed system without departing from the scope of the disclosure. Other embodiments of the system will be apparent to those skilled in the art from consideration of the specification and practice of the bushing for a track assembly disclosed herein. It is intended that the specification and examples be considered as exemplary only, with a true scope of the disclosure being indicated by the following claims and their equivalents.

What is claimed is:

1. A bushing for a track assembly, comprising:
   a tubular bushing substrate having a longitudinal length and an outer surface; and
   a plurality of white iron arc segments brazed to the outer surface of the tubular bushing substrate so as to be successively arrayed around a central portion of the tubular bushing substrate along a circumferential direction.

2. The bushing of claim 1, wherein at least one of the white iron arc segments extends over the central portion of the tubular bushing substrate, and extends less than an entirety of the longitudinal length of the tubular bushing substrate.

3. The bushing of claim 1, wherein at least one of the white iron arc segments is received in a recess formed in the outer surface of the tubular bushing substrate.

4. The bushing of claim 1, wherein at least one of the white iron arc segments is brazed to the tubular bushing substrate and brazed to another one of the white iron arc segments.

5. The bushing of claim 1, wherein a first white iron arc segment abuts a second white iron arc segment that is brazed to the outer surface of the tubular bushing substrate.

6. The bushing of claim 1, wherein the white iron arc segments collectively extend over a full circumference of the tubular bushing substrate.

7. The bushing of claim 1, wherein the tubular bushing substrate is formed of a high-carbon chromium steel.

8. The bushing of claim 1, wherein
   the tubular bushing substrate includes a carburized portion, and at least one of the white iron arc segments is fixed to the carburized portion.

9. The bushing of claim 1, wherein the plurality of white iron arc segments are secured to the tubular bushing substrate such that brazing filler secures each white iron arc segment to the tubular bushing substrate and to another white iron arc segment.

10. The bushing of claim 1, wherein each of the white iron arc segments has a central angle in a range of from 45 to 180 degrees.

11. The bushing of claim 1, wherein the plurality of white iron arc segments collectively extend 270 degrees or less of an entire circumference of the tubular bushing substrate.

12. A method of producing a bushing for a track assembly, comprising:
   forming a tubular bushing substrate with an outer surface;
   forming at least one white iron member separate from the tubular bushing substrate; and
   brazing the at least one white iron member to the outer surface of the tubular bushing substrate, wherein the brazing is performed using a holding fixture having a holding surface, and
   the brazing includes placing the holding surface of the holding fixture on a plurality of individual white iron members, so that the at least one white iron member and an additional white iron member are held in place while being brazed together and to the tubular bushing substrate.

13. The method of claim 12, wherein the at least one white iron member extends over a central portion of the tubular bushing substrate, and extends less than an entirety of a longitudinal length of the tubular bushing substrate.

14. The method of claim 12, wherein the at least one white iron member is received in a recess formed in the outer surface of the tubular bushing substrate.

15. The method of claim 12, wherein the individual white iron members collectively extend over a full circumference of the tubular bushing substrate.

16. A track assembly comprising:
   a bushing including:
      a tubular bushing substrate having a longitudinal length, an axial bore, and a circumferential recess formed in an outer surface of a central portion of the tubular bushing substrate; and
      a white iron sleeve received in the circumferential recess and wrapping at least partially around the central portion of tubular bushing substrate, the white iron sleeve including a plurality of white iron arc segments brazed to the tubular bushing substrate so as to be successively arrayed around the central portion of the tubular bushing substrate along a circumferential direction; and
   a pin received in the axial bore of the tubular bushing substrate.

17. The track assembly of claim 16, wherein at least one of the white iron arc segments has a central angle in a range of from 45 to 180 degrees.

18. The track assembly of claim 16, wherein the white iron sleeve extends less than a full circumference of the central portion of the tubular bushing substrate.

19. The track assembly of claim 18, wherein a portion of the full circumference exposed by the white iron sleeve faces a track shoe of the track assembly.

20. The track assembly of claim 16, wherein a portion of a thickness of the white iron sleeve protrudes out of the circumferential recess in a radial direction.

* * * * *